(12) United States Patent
Dang et al.

(10) Patent No.: US 12,366,281 B2
(45) Date of Patent: Jul. 22, 2025

(54) CHAIN BRACES AND PROCESSES FOR USING SAME

(71) Applicant: SOFEC, INC., Houston, TX (US)

(72) Inventors: Quoc Anh Dang, Cypress, TX (US); Steven Edward Eskridge, Waller, TX (US); Amir H. Izadparast, Houston, TX (US)

(73) Assignee: SOFEC, INC., Houston, TX (US)

( * ) Notice: Subject to any disclaimer, the term of this patent is extended or adjusted under 35 U.S.C. 154(b) by 348 days.

(21) Appl. No.: 18/057,409

(22) Filed: Nov. 21, 2022

(65) Prior Publication Data

US 2023/0160456 A1 May 25, 2023

Related U.S. Application Data

(60) Provisional application No. 63/282,010, filed on Nov. 22, 2021.

(51) Int. Cl.
| | |
|---|---|
| *F16G 13/18* | (2006.01) |
| *B63B 21/20* | (2006.01) |
| *B63B 73/40* | (2020.01) |
| *F16G 13/12* | (2006.01) |
| *F16G 15/02* | (2006.01) |

(52) U.S. Cl.
CPC .................................. *F16G 13/18* (2013.01)

(58) Field of Classification Search
CPC .......... F16G 13/18; F16G 13/12; F16G 15/02; B63B 21/20; B63B 73/49; B63B 2021/203
See application file for complete search history.

(56) References Cited

U.S. PATENT DOCUMENTS

| | | | | |
|---|---|---|---|---|
| 2,761,275 A | * | 9/1956 | William | .................. F16G 15/02 |
| | | | | 59/85 |
| 2,957,731 A | * | 10/1960 | Erwin | ..................... F16G 15/02 |
| | | | | 305/59 |

(Continued)

FOREIGN PATENT DOCUMENTS

| | | |
|---|---|---|
| DE | 2710550 A1 | 9/1978 |
| GB | 571185 A | 8/1945 |
| WO | 2014194502 A1 | 12/2014 |

OTHER PUBLICATIONS

International Search Report and Written Opinion for PCT/US2022/080222 dated Mar. 21, 2023.

*Primary Examiner* — Mohammed S. Alawadi
(74) *Attorney, Agent, or Firm* — Edmonds & Cmaidalka, P.C.

(57) ABSTRACT

A chain brace for restricting relative movement between first, second, and third serially connected links of a chain. The chain brace can include a wedge block defining a bore at least partially therethrough, first and second outer blocks, a capture frame that can include a reaction plate that can define a bore therethrough, and a tension member. The capture frame can be configured to position the outer blocks and the wedge block within the second link of the chain. The tension member can be positioned through the bore defined by the reaction plate and into the bore defined by the wedge block to apply a force on the wedge block such that the wedge block displaces the first and second outer blocks into contact with the ends of the first and third links of chain, respectively, to restrict relative movement between the first, second, and third links of the chain.

20 Claims, 8 Drawing Sheets

(56) References Cited

U.S. PATENT DOCUMENTS

| | | | | |
|---|---|---|---|---|
| 2,999,352 | A | * | 9/1961 | Linnenbank ............ F16G 15/02 59/87 |
| 3,822,549 | A | * | 7/1974 | Rieger .................... F16G 15/02 59/85 |
| 2008/0120959 | A1 | * | 5/2008 | Tout ........................ F16G 13/12 59/93 |

* cited by examiner

CHAIN BRACES AND PROCESSES FOR USING SAME

CROSS-REFERENCE TO RELATED APPLICATION

This application claims priority to U.S. Provisional Patent Application No. 63/282,010, filed on Nov. 22, 2021, which is incorporated by reference herein.

FIELD

Embodiments described generally relate to chain braces and processes for using same to restrict relative movement between adjacent links of a chain.

BACKGROUND

In the offshore energy and maritime industries, for example the oil, gas, and renewable energy industry, and the shipping industry, chains of various sizes and types including studlink chains and studless chains are employed for various purposes including providing a mooring link between a floating vessel and a seabed. Chains of various types can also be used in other, industries, for example in the mining industry. In these industries, it is sometimes desirable to restrict movement between adjacent chain links, either for a temporary period, for example during an installation phase, or permanently, for example to restrict or limit out of plane bending of chain mooring legs of a floating vessel. The out of plane bending can occur when the individual links of chain are subject to bending forces. The bending force can occur when a tension force being applied to a chain is not directly in line with the orientation of a connection point of the end of the chain. Out of plane bending of a chain can lead to pre-mature failure of the chain legs due to cyclical fatigue bending loading on the chain link(s). Mooring systems can be designed to limit out of plane bending by providing a chain support assembly to provide an articulated connection between the chain and the vessel. The chain support assembly can include a trunnion assembly that includes a trunnion. With the introduction of a chain support assembly, the rotation of the chain relative to the vessel is accommodated by the trunnion assembly thus reducing out of plane bending on the chain.

Bending of the links in the chain, however, can still occur due to rotational friction in the trunnion assembly. In some instances, whether due to inadequate initial design, inadequate assessment of the meteorology and physical oceanography (metocean) and/or environmental conditions, changes to the metocean and/or environmental conditions, unexpected accelerated corrosion of the chain, unexpected degradation of the friction performance of the trunnion, or a desire to extend the life of the facility, it can be desirable to lengthen the lever arm of the chain support assembly to overcome the friction in the trunnion assembly, thereby further limiting the out of plane bending of the chain. This can be a costly and potentially hazardous operation.

There is a need, therefore, for improved chain braces and processes for using same to restrict relative movement between adjacent links of a chain.

SUMMARY

Chain braces and processes for using same to restrict relative movement between first, second, and third serially connected links of a chain is provided. In some embodiments, the chain brace can include a wedge block, a first outer block, a second outer block, a capture frame, and a tension member. The wedge block can have a first end and a second end. The wedge block can define a bore at least partially therethrough that can be oriented along an axis of the wedge block extending from the first end toward or through the second end thereof. A width of the wedge block between a set of opposing sides extending from the second end to the first end can taper toward the first end thereof. Each outer block can have a first end, a second end, and a side having a concave surface disposed between the first and second ends thereof. The capture frame can include a reaction plate that defines a bore therethrough. The capture frame can be configured to position the first outer block, the wedge block and the second outer block within the second link of the chain. The wedge block can be configured to be positioned between the first outer block and the second outer block. The first ends of the first outer block, the second outer block, and the wedge block can each be orientated toward the reaction plate. The concave surface of the first outer block can be configured to engage with and partially receive an outer surface of an end of the first link of chain. The concave outer surface of the second outer block can be configured to engage with and partially receive an outer surface of an end of the third link of chain. The tension member can be configured to be positioned through the bore defined by the reaction plate and at least partially into the bore defined by the wedge block at the first end thereof and to apply a force on the wedge block to move the wedge block in a direction toward the reaction plate such that the wedge block displaces the first and second outer blocks into contact with the ends of the first and third links of chain, respectively, to restrict relative movement between the first, second, and third links of the chain.

In some embodiments, a process for restricting relative movement between first, second, and third serially connected links of a chain can include installing a chain brace about and within the second link of chain. The chain brace can include a wedge block, a first outer block, a second outer block, a capture frame, and a tension member. The wedge block can have a first end and a second end. The wedge block can define a bore at least partially therethrough that can be oriented along an axis of the wedge block extending from the first end toward or through the second end thereof. A width of the wedge block between a set of opposing sides extending from the second end to the first end can taper toward the first end thereof. The first outer block and the second outer block can each include a first end, a second end, and a side that can include a concave surface disposed between the first and second ends thereof. The capture frame can include a reaction plate that can define a bore therethrough. The capture frame can position the first outer block, the wedge block, and the second outer block within the second link of the chain. The wedge block can be positioned between the first outer block and the second outer block. The first ends of the first outer block, the second outer block, and the wedge block can be orientated toward the reaction plate. The concave surface of the first outer block can be configured to engage with and partially receive an outer surface of an end of the first link of chain. The concave outer surface of the second outer block can be configured to engage with and partially receive an outer surface of an end of the third link of chain. The tension member can be positioned through the bore defined by the reaction plate and at least partially into the bore defined by the wedge block at the first end thereof. The process can also include applying a force on the wedge block with the tension member to move the wedge block in a direction toward the reaction plate such that the wedge block displaces the first and second outer blocks to cause the concave surface of the first outer block and the concave surface of the second outer block to engage with and partially receive the outer surfaces of the ends of the first and third links of chain, respectively, to restrict relative movement between the first, second, and third links of the chain.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
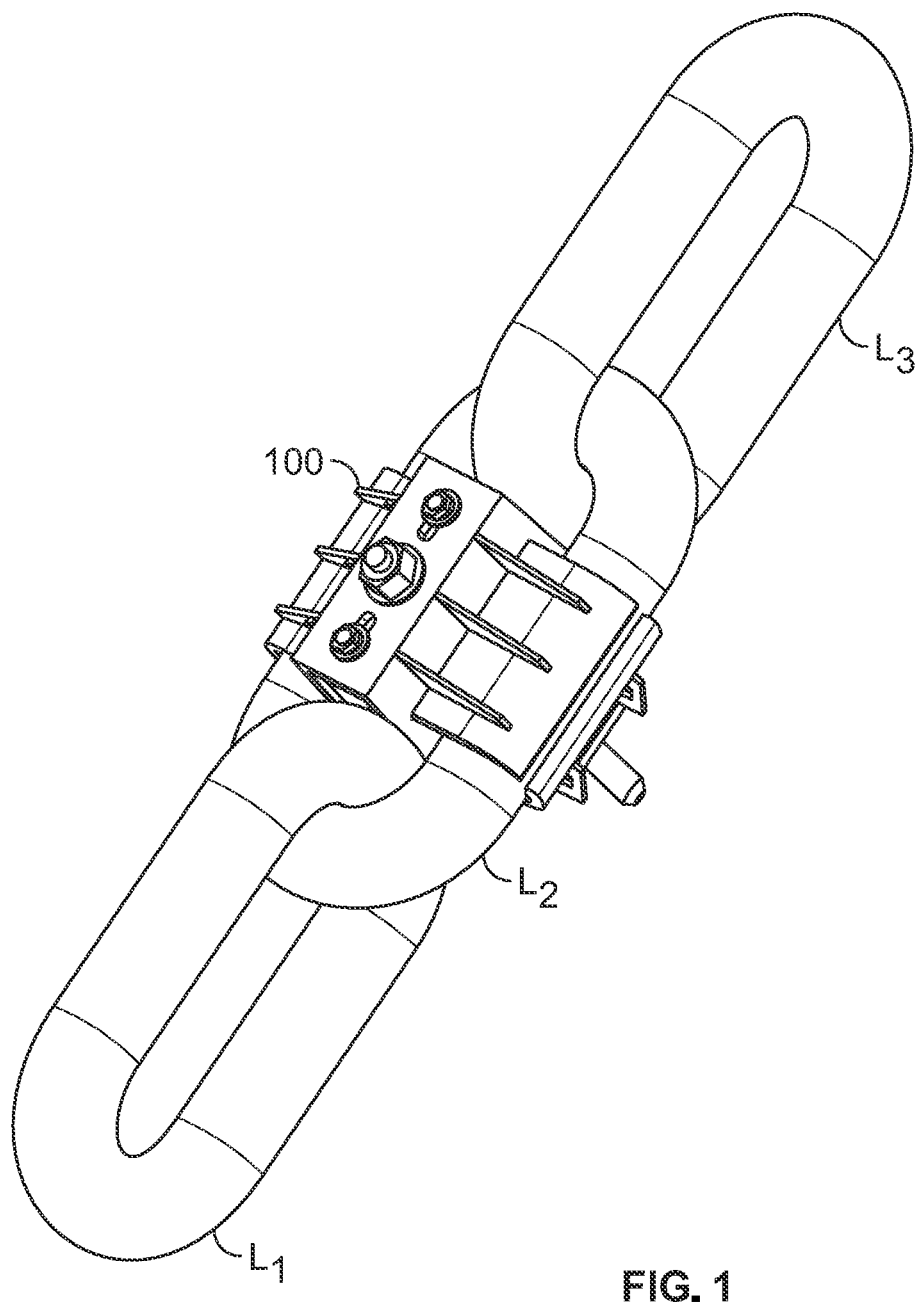
FIG. 1 depicts a perspective view of an illustrative chain brace installed on first, second, and third serially connected links of chain, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

It should also be understood that the phrases "disposed therein", "disposed within" and other similar phrases, when describing a component, e.g., a wedge or pin, describe the component as being partially disposed therein/within or completely disposed therein/within. For example, if the component is a tension member that can be disposed within a bore, the phrase "the tension member can be disposed within the bore" means the tension member can be disposed partially within the bore or completely within the bore.

FIG. 1 depicts a perspective view of an illustrative chain brace 100 installed on a second link L2 of a chain located between a first link L1 and a third link L3 of the chain, according to an embodiment. The chain brace 100 can reduce, restrict, or prevent relative movement between the first link of chain L1 and the second link of chain L2 and/or between the second link of chain L2 and the third link of chain L3 by forcing or otherwise urging the ends of the adjacent and interconnected links of chain together with a contact or bearing force that is additive with the contact force attributable to or arising from the tension in the chain. This additional normal contact force can increase the rotational break-out friction between adjacent, interconnected links of chain and thus reduce, restrict, or prevent movement between adjacent interconnected links of chain.

Figure 2:
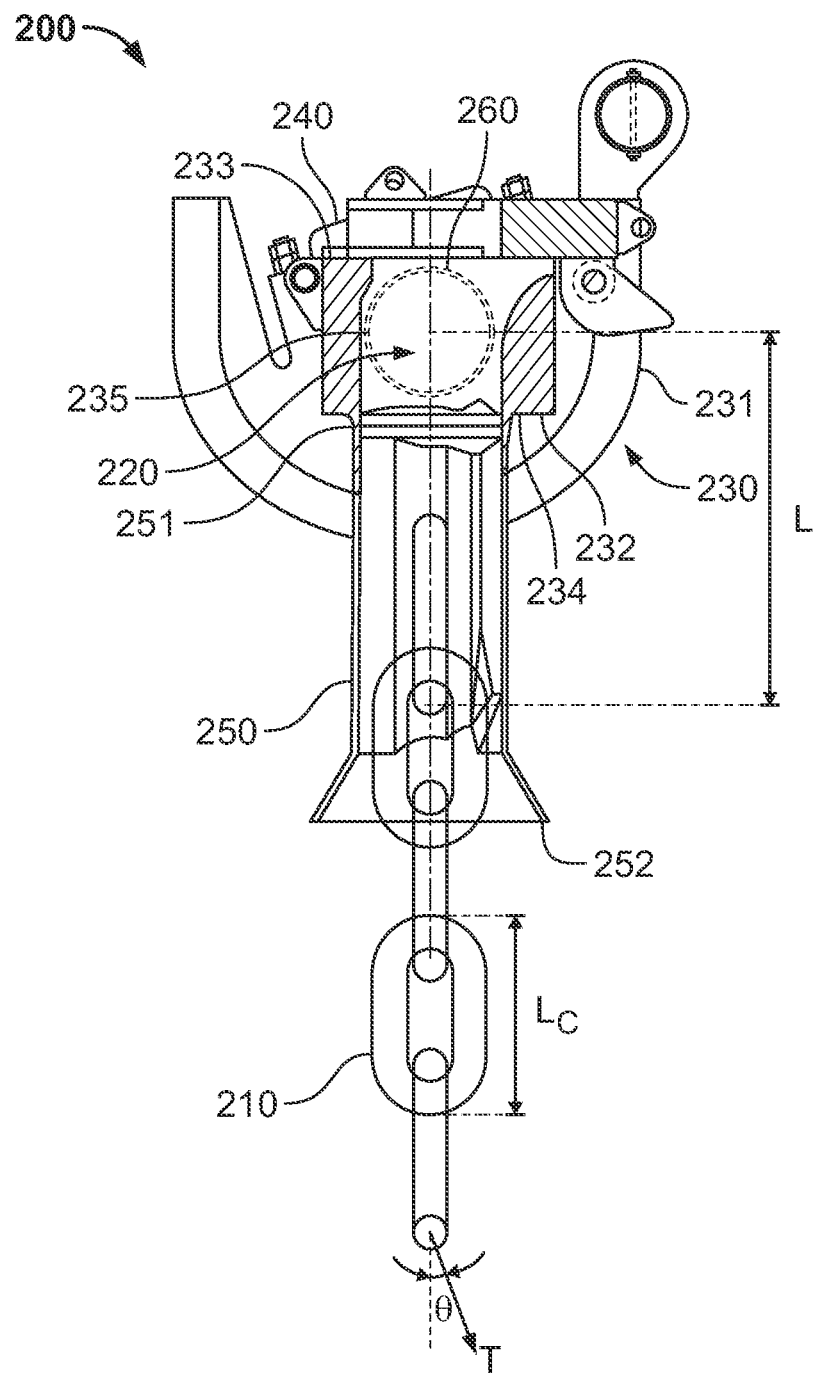
FIG. 2 depicts a chain installed and supported by a chain support assembly, according to one or more embodiments described.

FIG. 2 depicts a chain 210 installed and supported by a chain support assembly 200, according to one or more embodiments. The chain support assembly 200 can be used to limit or reduce out of plane bending of the chain 210. The chain support assembly 200 can provide an articulated link between a vessel and the chain 200. In some embodiments, the chain support assembly 200 can have a single axis of rotation 220 or two axes of rotation, with a single axis of rotation being shown. The chain support assembly 200 can include a trunnion assembly 230. The trunnion assembly 230 can include a fixed bearing block part 231 and a rotating part 232, a chain stopper assembly 240, and a tube assembly 250 through which the chain 210 can pass. The chain stopper assembly 240 can be mounted on or connected to a first side 233 of the rotating part 232 of the trunnion assembly 230. The tube assembly 250 can have a first end 251 that can be mounted on or connected to a second side 234 of the rotating part 232 of the trunnion assembly 230 that opposes the side that the chain stopper 240 is disposed on.

The chain 210 can enter the tube assembly 250 at a second end 252 of the tube assembly 250 and can be supported by or locked off above the rotating part of the trunnion assembly 232 by the chain stopper assembly 240. The trunnion assembly 230 can include a pair of cylindrical protrusions 235. The cylindrical protrusions 235 can be mounted to the rotating part 232 of the trunnion assembly 230 and can be supported by the fixed bearing block part 231 that can be mounted on the vessel and allow the rotating part 232 of the trunnion assembly 230 to rotate relative to the vessel about the axis of rotation 220. The trunnion assembly 230 can allow the chain stopper assembly 240, the tube assembly 250 and the chain 210 to rotate about the axis of rotation 220 in an angle relative to a vertical axis, i.e. a declination angle. A bushing, sleeve or other shim material, hereafter referred to as a bushing 260, can be disposed between an inner surface of the bearing block assembly 231 and an outer surface of the cylindrical protrusions 235. The bushing 260 can be manufactured from a low friction material such as bronze, or a composite, laminate material to reduce rotational friction between the cylindrical protrusion and the bearing block.

The following equations describe the mechanics governing the out of plane bending of the chain 210 relative to the chain support assembly 200. While this formulation pertains to a single axis chain support assembly, it will be readily apparent to those skilled in the art this formulation can also be adapted to a dual axis chain support assembly: $M1=T*\mu B*R$, $M2=T*\sin\Theta*L$ and $M3=T* \sin\Theta*\mu C*D/2$, $M4=T*\sin\Theta*(L_C)$, where: M1 is the break-out torque of the trunnion assembly 230 at an applied tension T due to friction between the cylindrical protrusion 235 or bushings 260 and the bearing blocks 231, M2 is the torque applied to the trunnion assembly 230 by the chain at the second end 252 of the tube assembly 250 due to the misalignment of the tension T relative to the chain support assembly 200, M3 is the break-out torque of a chain link relative to an adjacent chain link at an applied tension due to friction between two adjacent chain links, M4 is the out of plane bending moment on a link of chain due to the misalignment of the tension relative to the chain support assembly, T is the Tension force of the chain acting on the chain support assembly 200, $\mu_B$ is the friction coefficient of the bushing material 260 at the trunnion, $\mu_C$ is the friction coefficient between two adjacent links of chain, R is the radius of the cylindrical protrusion of the trunnion assembly 230, Θ is the misalignment angle of the tension T applied to the chain at the point of breakout of either the chain support trunnion assembly or the chain link, L is the lever arm which is the distance from the center of rotation of the chain support assembly to the point of application of the lateral force from the chain acting on the tube assembly 250 of the chain support assembly 200, $L_C$ is the lever arm associated with out of plane bending of a chain link that is approximately the length of a single link of chain, and D is the diameter of the links of chain.

The rotating part of the trunnion assembly 232 begins to rotate relative to the fixed bearing block part 231 when M2 is equal to M1, thus: $\sin\Theta=(\mu_B*R)/L$. Accordingly, L and $\mu_B$ can be selected by the designer of the chain support assembly 200 to minimize Θ and thus the out of plane bending on the chain to acceptable limits for a given application. For example, if L is relatively large and μB is relatively low, then according to the above formulae, the angle Θ is thus small and the out of plane bending moment on the chain is low. As can be seen, once the angle Θ is determined from the configuration of the chain support, i.e. from the above formulation and the specific values of $\mu_B$, R and L then the out of plane bending loading and the out of plane bending fatigue on the chain can be calculated. Typically, μB, R and L are selected for a given service application, for example considering the metocean conditions, environmental conditions, motions of the vessel, service life of the mooring installation, and other relevant parameters that are understood by those skilled in the art. In certain circumstances, it can be desirable to extend the lever arm L. This can be achieved by replacing the tube assembly 250 with a longer tube assembly or extending the tube assembly 250, but this can be a complex, costly and potentially hazardous operation. As a less complex, cost effective and safer alternative, at least one chain brace 100 can be installed on the chain 210 at or near the second end 252 of the chain tube assembly 250. This increases the length L of the lever arm and thus reduces the out of plane bending M4 acting on a link of the chain 210.

Figure 3:
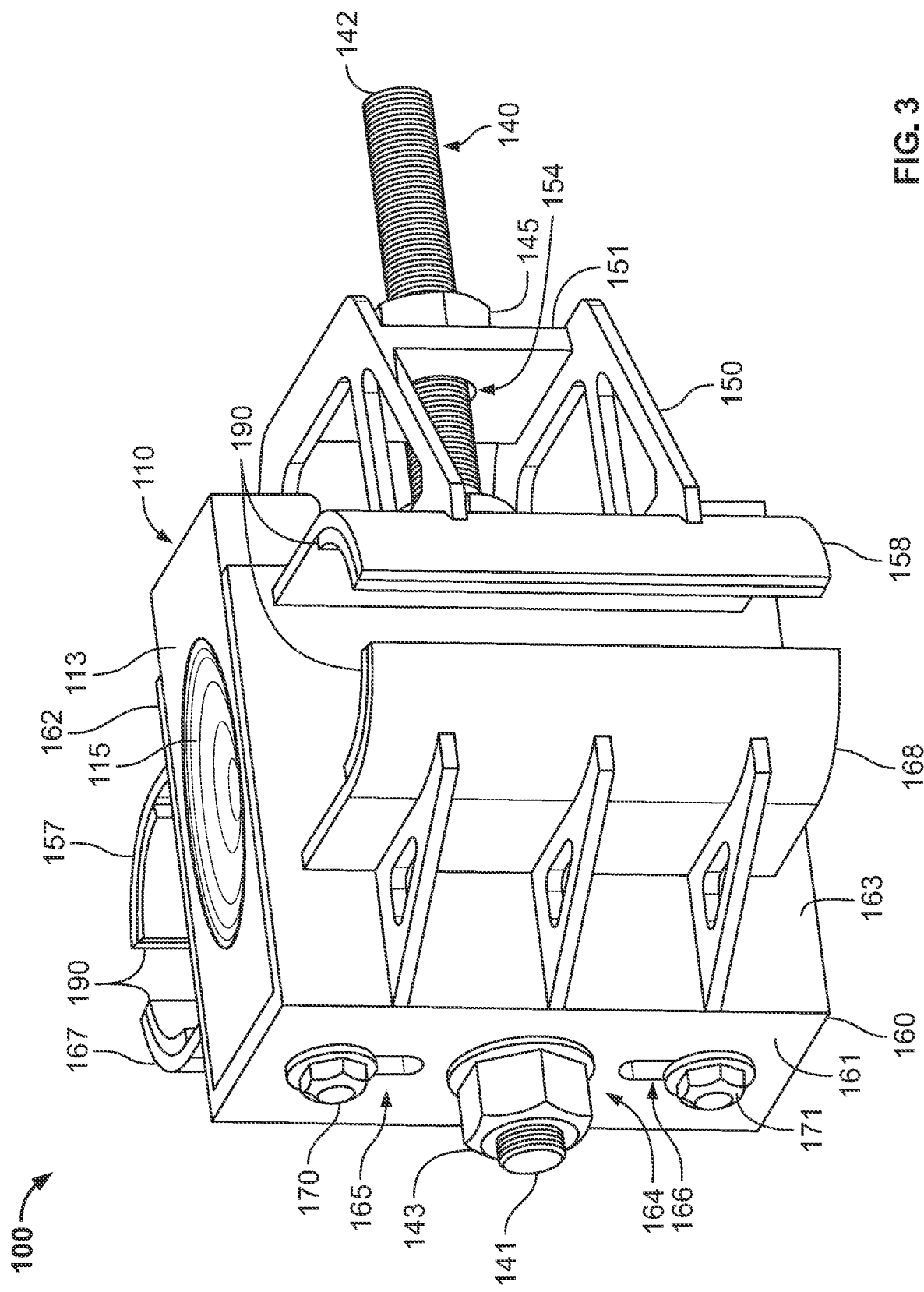
FIG. 3 depicts a perspective view of the chain brace, shown in FIG. 1.
Figure 4:
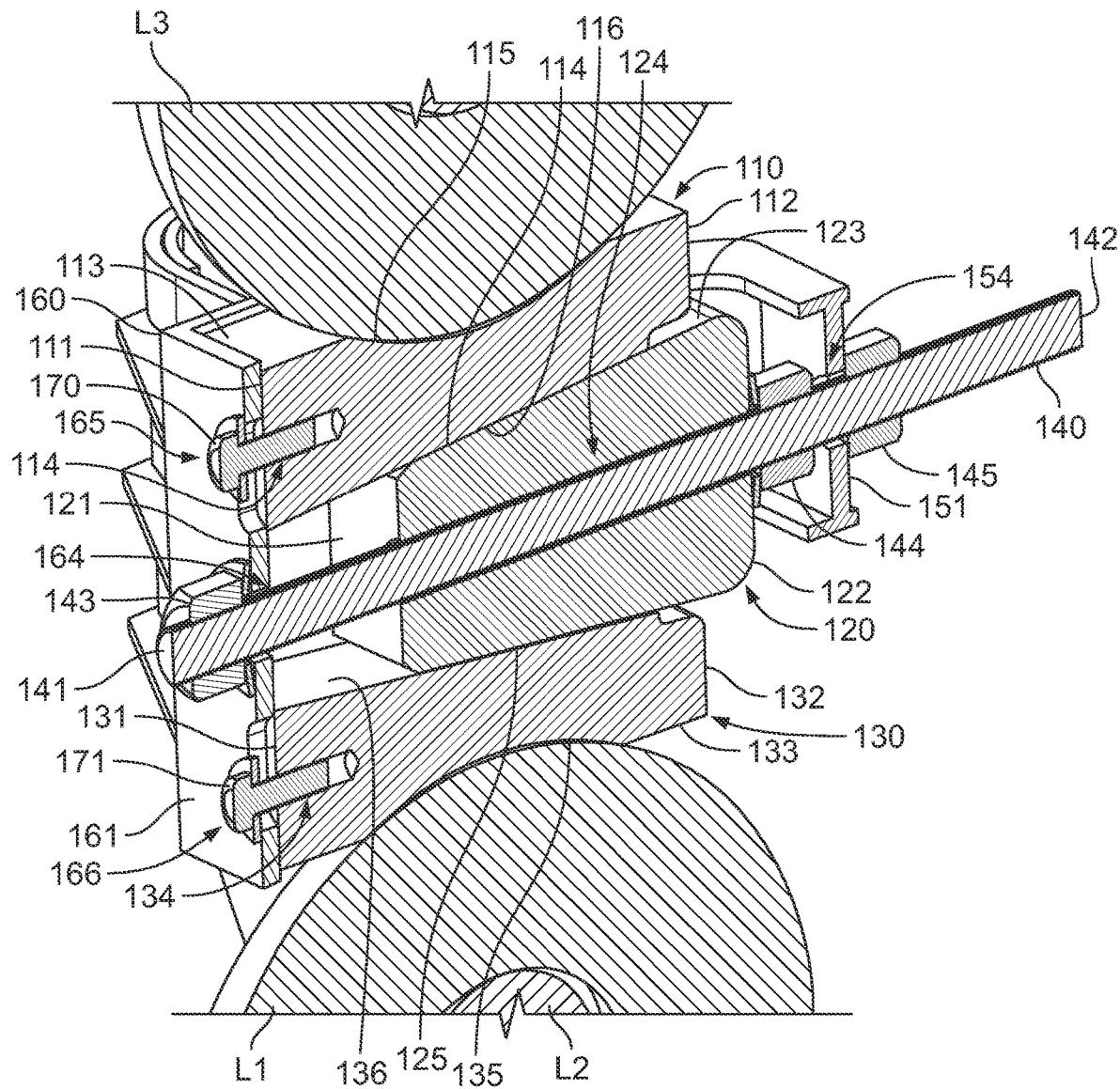
FIG. 4 depicts a close-up cross-sectional view of the chain brace shown in FIG. 1.
Figure 6:
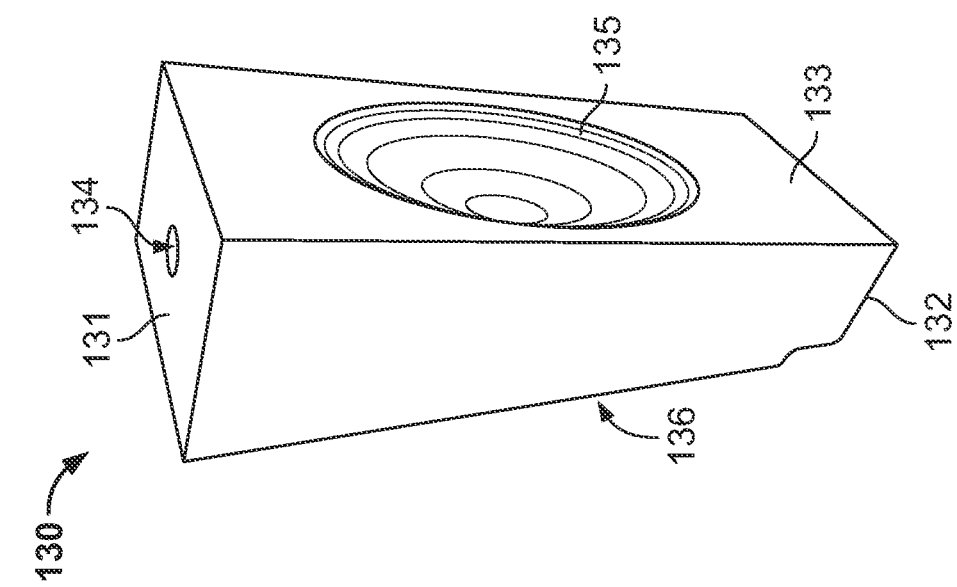
FIG. 6 depicts a perspective view of an illustrative second outer block of the chain brace shown in FIGS. 3 and 4.
Figure 5:
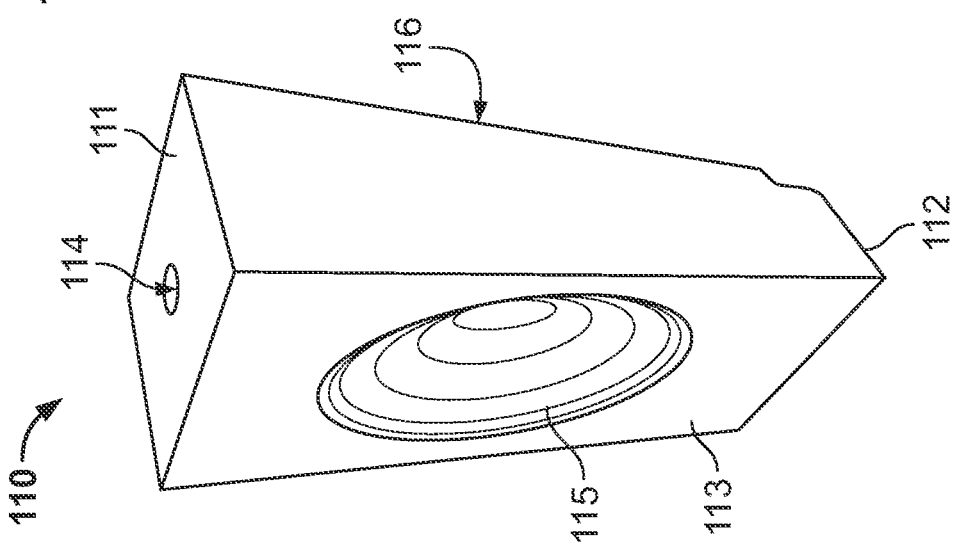
FIG. 5 depicts a perspective view of an illustrative first outer block of the chain brace shown in FIGS. 3 and 4.

FIG. 3 depicts a perspective view of the chain brace 100 shown in FIG. 1 and FIG. 4 depicts a close-up cross-sectional view of the chain brace 100 shown in FIG. 1. Referring to FIGS. 3 and 4, the chain brace 100 can include a first outer block 110, a second outer block 130 and a wedge block 120. Referring to FIG. 5, the first outer block 110 can have a first end 111, a second end 112, a first side 113 that can include a concave surface 115, and a second side 116 opposite the first side 113. Referring to FIG. 6, the second outer block 130 can have a first end 131, a second end 132, a first side 133 that can include a concave surface 135, and a second side 136 opposite the first side 133. In some embodiments, the concave surfaces 115, 135 of the first and second outer blocks 110, 130 can be configured to conform with, match with, matingly engage with, or otherwise receive the external shape of an end of a link of chain L1, L3, respectively. In some embodiments, the first sides 113, 133 or at least the concave surfaces 115, 135 of the first and second outer blocks 110, 130, respectively, can be coated with an insulating material, for example a polymer or ceramic material to electrically isolate the chain brace 110 from the chain. In some embodiments, the second sides, 116, 136 of the first and second outer block 110, 130 can include a low friction coating disposed thereon. In some embodiments, the first ends 111, 131 of the first and second outer blocks 110, 130, respectively, can have a width that is greater than a width of the second ends 112, 132 of the first and second outer blocks 110, 130, respectively.

In some embodiments, the first and/or second outer blocks can define a bore 114, 134 at the first ends 111, 131 of one or both of the outer blocks 110, 130. Each bore 114, 134, if present, can be at least partially disposed therethrough. In some embodiments, an inner surface of the bores 114, 134, if present, can each be configured with a helical thread.

Figure 7:
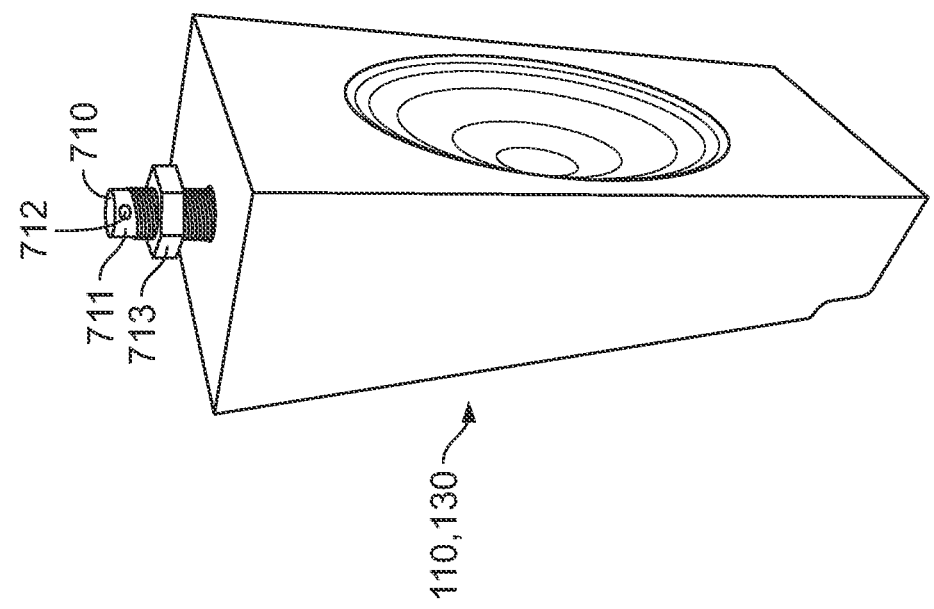
FIG. 7 depicts a perspective view of an illustrative first or second outer block of the chain brace having a protrusion disposed on a first end thereof, according to one or more embodiments described.

In some embodiments, the first ends 111, 131 of one or both of the first and second outer blocks 110, 130 can include a protrusion 710 extending therefrom as depicted in FIG. 7. In some embodiments, if the first ends 111, 131 of the first and second outer blocks 110, 130 include the protrusion 710, the protrusion can include a helical thread 711 about an outer surface thereof and/or can define one or more bores 712 radially therethrough that can be configured to receive a fastener. In some embodiments, a nut 713 can be configured to be disposed on the protrusion 710 and/or a fastener, e.g., a cotter pin, rod, bolt/nut, or the other fastener, configured to be disposed at least partially through the bore 712.

Figure 8:
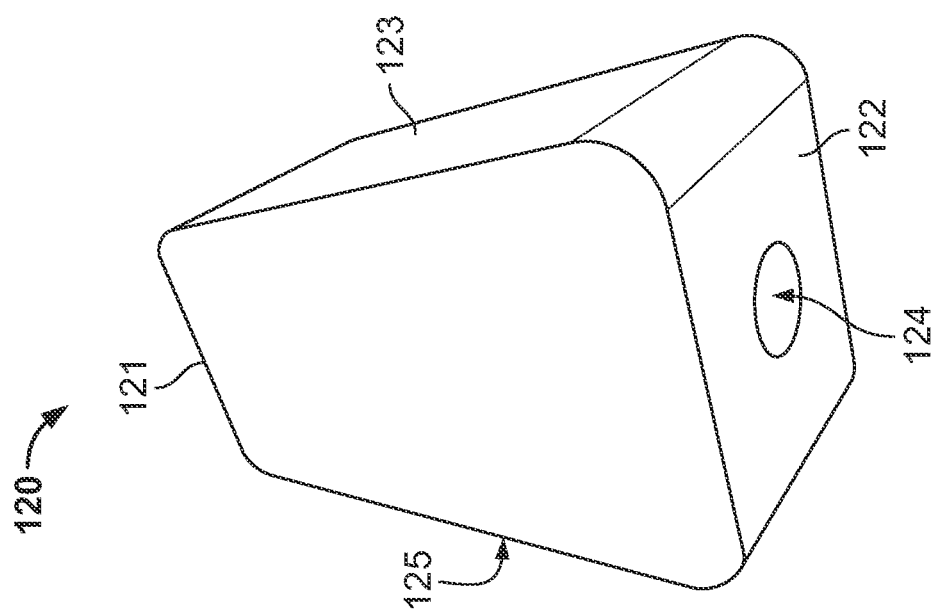
FIG. 8 depicts a perspective view of an illustrative wedge block of the chain brace shown in FIGS. 3 and 4.

Referring to FIG. 8, the wedge block 120 can include a first end 121, a second end 122, a first side 123, and a second side 125. The first side 123 of the wedge block 120 can be configured to interface with the second side 116 of the first outer block 110. The second side 125 of the wedge block 120 can be configured to interface with the second side 136 of the second outer block 130. In some embodiments, the first and/or second sides 123, 125 of the wedge block 120 can have a low friction coating disposed thereon. In other embodiments, a low friction material can be disposed between the first side 123 of the wedge block 120 and a second side 116 of the first outer block 110 and/or a low friction material can be disposed between the second side 125 of the wedge block 120 and a second side 136 of the second outer block 130. The low friction coating or material can be or can include, but is not limited to, a polytetrafluoroethylene coating, a tungsten disulfide coating, a molybdenum disulfide coating, or other similar low friction material. Suitable commercially available low friction materials can include those sold under the tradenames TEFLON® and XYLAN®.

The wedge block 120 can define a bore 124. The bore 124 defined by the wedge block 120 can be at least partially therethrough and can be oriented along an axis of the wedge block 120 that can extend from the first end 121 toward or through the second end 122 thereof. Said another way, the bore 124 defined by the wedge block 120 can be partially disposed through the wedge block 120 (not shown) or fully disposed though the wedge block 120. In some embodiments, an inner surface of the bore 124 can be configured with helical threads (not shown) or can be a smooth bore, as shown in FIG. 4. In some embodiments, the cross-sectional shape of the bore 124 can be circular or any other desired shape such as a polygon, e.g., a rectangular cross-sectional shape, or a combination thereof. For example, the bore 124 can have a circular cross-sectional shape at or toward the first end 121 and a polygonal cross-sectional shape at or toward the second end 122. The first end 121 of the wedge block 120 can have a width that is less than the width of the second end 122 of the wedge block 120. In some embodiments, the bore 124 can be configured with at least one longitudinal groove.

The first outer block 110, the wedge block 120, and the second outer block 130 can be manufactured, fabricated, cast, forged, machined or otherwise formed or produced from a steel, stainless steel, aluminum, a composite polymer, carbon fiber, bronze or other suitable materials based, at least in part, on the expected loads and particular application being considered that will be apparent to those skilled in the art.

Figure 9:
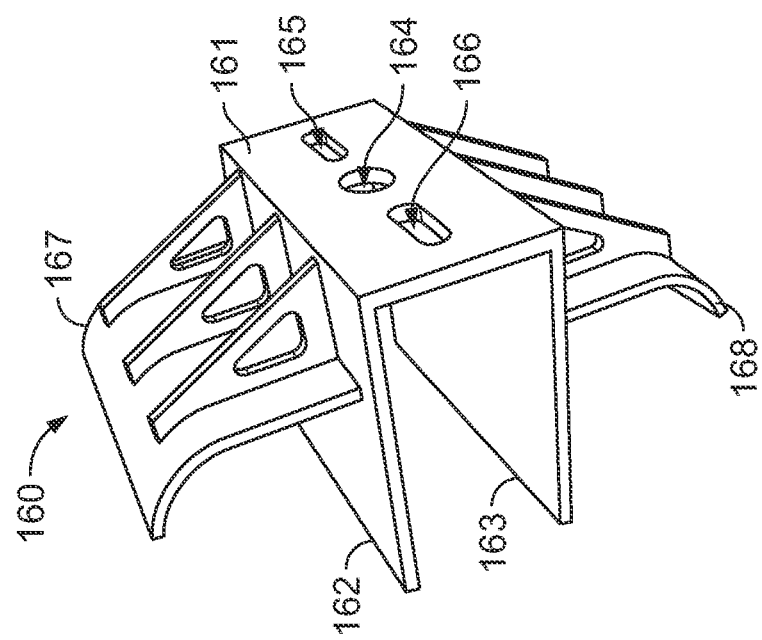
FIG. 9 depicts a perspective view of an illustrative capture frame of the chain brace shown in FIGS. 3 and 4.

The chain brace 100 can also include a capture frame 160. Referring to FIG. 9, the capture frame 160 can include a first side plate 162 and a second side plate 163. The first and second side plates 162, 163 can be affixed, joined, welded, bolted, or otherwise attached to a reaction plate 161. The first and second side plates 162, 163 together with the reaction plate 161 can be arranged and configured to capture the first and second outer blocks 110, 130, and the wedge block 120 within the capture frame 160. In some embodiments, the capture frame 160 can include a first and a second bracket 167, 168. The first and second brackets 167, 168 of the capture frame 160 can each be configured to engage with the sides of a link of chain, for example the sides of the second link of chain L2. The first and second brackets 167, 168 of the capture frame 160 can be formed, shaped, molded, bent, rolled or otherwise formed to at least partially conform with the shape of the sides of the link of chain. The first and second brackets 167, 168 of the capture frame 160 can be manufactured from plate steel, a composite material, stainless steel, or other suitable material.

The capture frame 160 can be configured to position the first and second outer blocks 110, 130 and the wedge block 120 at least partially within the second link of chain L2. The reaction plate 161 of the capture frame 160 can define a bore 164 therethrough. The first ends 111, 131, 121 of the first and second outer blocks 110, 130 and the wedge block 120, respectively, can be orientated toward the reaction plate 161. The bore 164 defined by the reaction plate 161 and the bore 124 defined by the wedge block 124 can be aligned along a common longitudinal axis. In some embodiments, the reaction plate 161 can also define a first slot 165 and/or a second slot 166. In some embodiments, the first and second slots 165, 166 can be configured as elongated rectangular bores with rounded corners disposed through the reaction plate 161. In some embodiments, the first and/or second slots 165, 166 can align with the first and/or second bores 114, 134 of the first and/or second outer blocks 110, 130 respectively. In other embodiments, the first and/or second slots 165, 166 can align with and receive the protrusion 710 that can optionally be disposed on the first end 111 of the first outer block 110 and/or the first end 131 of the second outer block 130.

Returning to FIGS. 3 and 4, in some embodiments, the chain brace 100 can include a first fastener 170 and/or a second fastener 171. In some embodiments, the first and second fasteners 170, 171 can each be a screw, a cap screw, a bolt, a combination of a bolt and washer, or other similar fastener and can be disposed through the first slot 165 of the reaction plate 161 and into the bore 114 defined by the first outer block 110. In some embodiments, the first fastener 170 can be configured to be threadingly engaged with helical threads of the bore 114 defined by the first outer block 110 such that the first outer block 110 can translate in a longitudinal direction toward or away from the first chain link L3, but not in a lateral direction that is perpendicular to the longitudinal direction. The second fastener 171 can be configured to be threadingly engaged with the helical threads of the bore 134 defined by the second outer block 130 such that the second outer block 130 can translate in a longitudinal direction toward or away from the third chain link L1, but not in a direction that is perpendicular to the first direction. The first and second fasteners 170, 171 can be configured to retain the first outer block and the second outer block 110, 130 respectively within the capture frame 160.

In other embodiments, the first fastener 170 and/or the second fastener 171 can be a cotter pin, a nut 713, or other fastener configured to engage with a helical thread 711 about the outer surface thereof and/or configured to be at least partially disposed within a radial bore 712 defined by the protrusion 710 such that the first and/or second outer blocks 110, 130 can translate in a longitudinal direction toward or away from the first chain link L3 and/or the third chain link L1, but not in a lateral direction that is perpendicular to the longitudinal direction.

Figure 10:
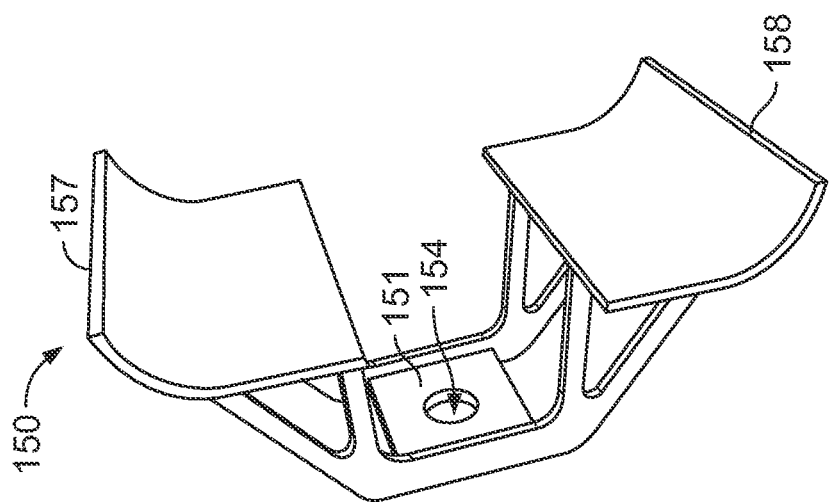
FIG. 10 depicts a perspective view of an illustrative retainer frame of the chain brace shown in FIGS. 3 and 4.

In some embodiments, the chain brace 100 can include an optional retainer frame 150. Referring to FIG. 10, the retainer frame 150 can be configured to retain the first outer block 110, second outer block 130 and the wedge block 120 within the capture frame 160. The retainer frame 150 can include a first and second bracket 157, 158. The first and second brackets 157, 158 of the retainer frame 150 can each be configured to engage with the sides of a link of chain, for example the sides of the second link of chain L2. The first and second brackets 157, 158 of the retainer frame 150 can be formed, shaped, molded, bent, rolled or otherwise formed to at least partially conform with the shape of the sides of a link of chain. The first and second brackets 157, 158 of the retainer frame 150 can be manufactured from plate steel, a composite material, stainless steel, other suitable material.

The retainer frame 150 can matingly engage with the capture frame 160 and be configured to retain the first outer block 110, the second outer block 130 and the wedge block 120 within the capture frame 160. The retainer frame 150 can include a secondary reaction plate 151 that can define a bore 154 therethrough. The bore 154 defined by the secondary reaction plate 151 can be aligned with the longitudinal axis of the bore 124 of the wedge block 120 and bore 164 defined by the reaction plate 161. The bore 154 defined by the secondary reaction plate 151 can be circular or any polygonal shape, e.g., rectangular.

The capture frame 160 and the retainer frame 150 can be manufactured, fabricated, cast, forged, machined, welded or otherwise formed or produced from a steel, stainless steel, aluminum, a composite polymer, bronze or other suitable materials based on, at least in part, on the expected loads and particular application being considered.

The chain brace 100 can include a tension member 140. In some embodiments, the tension member 140 can be configured as an elongated structural member. In some embodiments, the tension member 140 can be configured as a cylinder, a rod, a threaded bar stock, a cylinder with at least one longitudinal protrusion extending at least partially along an exterior surface thereof, a threaded fastener, or any combination thereof. In some embodiments, the tension member 140 can be a threaded rod or a threaded bolt. In some embodiments, the tension member 140 can be a rod that can have a portion of the outer surface that can be threaded and a portion of the outer surface can be smooth or non-threaded. For example, the ends of the tension member 140, when in the form of a rod, can be threaded and a middle section between the threaded ends can be smooth, e.g., the same as or similar to a double-end stud bolt. In other embodiments, the tension member 140 can be a bolt having a threaded end with a smooth section between the bolt head. In still other embodiments, the tension member 140 can be similar to a carriage bolt and the square or other polygonal cross-sectional shape below the head of the carriable bolt can configured to matingly engage with the bore 124 of the wedge block 120 or, if the retainer frame 150 is present, the bore 154 defined by the secondary reaction plate 151.

The tension member 140 can be positioned through the bore 164 defined by the reaction plate 161 and at least partially within or through the bore 124 defined by the wedge block 120. The tension member 140 can be configured to apply a force on the wedge block 120 to displace the wedge block in a direction toward the reaction plate 161 such that the wedge block 120 displaces the first and second outer blocks 110, 130 in a direction toward the first and third links of chain L1, L3, respectively, thereby placing the concave surface 115 of the first outer block 110 in abutting contact with the first link of chain L1 and placing the concave surface 135 of the second outer block 130 in abutting contact with the third link of chain L3. The force can be generated by any number of methods that will be apparent to those skilled in the art.

In some embodiments, the tension member 140 can be configured as a screw jack with a first nut 143 disposed toward a first end 141 of the tension member 140 and the reaction plate 160. A second nut 144 can be disposed toward a second end 142 of the tension member 140 and toward the second end 122 of the wedge block 120. The force can then be generated by turning the nut 143 and reacting the nut 143 against the reaction plate 161 while keeping the second nut 144 fixed relative to the tension member 140 and the secondary reaction plate 151. In some embodiments, the tension member 140 can threadingly engage directly with the wedge block 120 and thus the second nut 144 can be eliminated. In some embodiments, as noted above, the tension member 140 can optionally include a longitudinal protrusion or profile, not shown, that can extend at least partially along the exterior surface thereof that can matingly engage with a corresponding optional groove defined by an inner surface of the bore 124 of the wedge block 120, thus restricting relative rotation between the wedge block 120 and the tension member 140. The force can then be generated by turning nut 143 and reacting the nut 143 against the reaction plate 161 while keeping the tension member 140 rotationally static relative to the wedge block 120. Alternatively, the force can be generated by rotating the tension member 140 relative the wedge block 120 while keeping the nut 143 static relative to the tension member 140. In some embodiments, a hydraulic jack or hydraulic cylinder can be affixed to the first end 141 of the tension member 140 and the force can be applied to the tension member 140 by the hydraulic jack or hydraulic cylinder reacting against the reaction plate 161. As such, in some embodiments, the tension member 140 can include a hydraulic jack or hydraulic cylinder that can be configured to apply the force to the tension member. In some embodiments, a third nut 145 can be disposed on and threadingly engaged with the tension member 140 on the exterior of the secondary reaction plate 151 to secure the tension member 140 to the secondary reaction plate 151 and to restrict movement of or rotation of the tension member 140 relative to the reaction plate 161. The third nut 145 can be tightened or installed after the tensioning operation of the tension member 140 is performed. The tension member 140 can be a steel, stainless steel, alloy steel or other suitable material.

Figure 11:
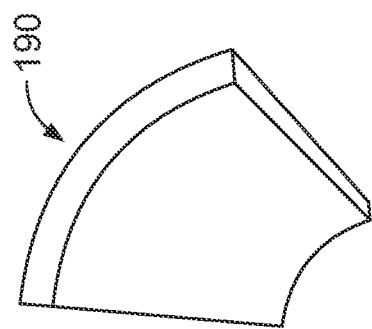
FIG. 11 depicts a perspective view of an illustrative cushion of the chain brace shown in FIG. 3 that can optionally be disposed between a bracket of the capture frame or the retainer frame and a link of chain, according to one or more embodiments described.

In some embodiments, the chain brace 100 can include at least one cushion 190. Referring to FIG. 11, the cushion 190 can be a formed from a polymer, a rubber material, or any similar and suitable cushion material. The cushion 190 can be disposed between the sides of the second link of chain L2 and the first and second brackets 167, 168 of the capture frame 160 and, if present, the first and second brackets 157, 158 of the retainer frame 150. The cushion 190 can provide a flexible connection between the chain brace 100 and the second link of chain L2. The cushion can also electrically isolate the chain brace 100 from the second link of chain L2.

Figure 12:
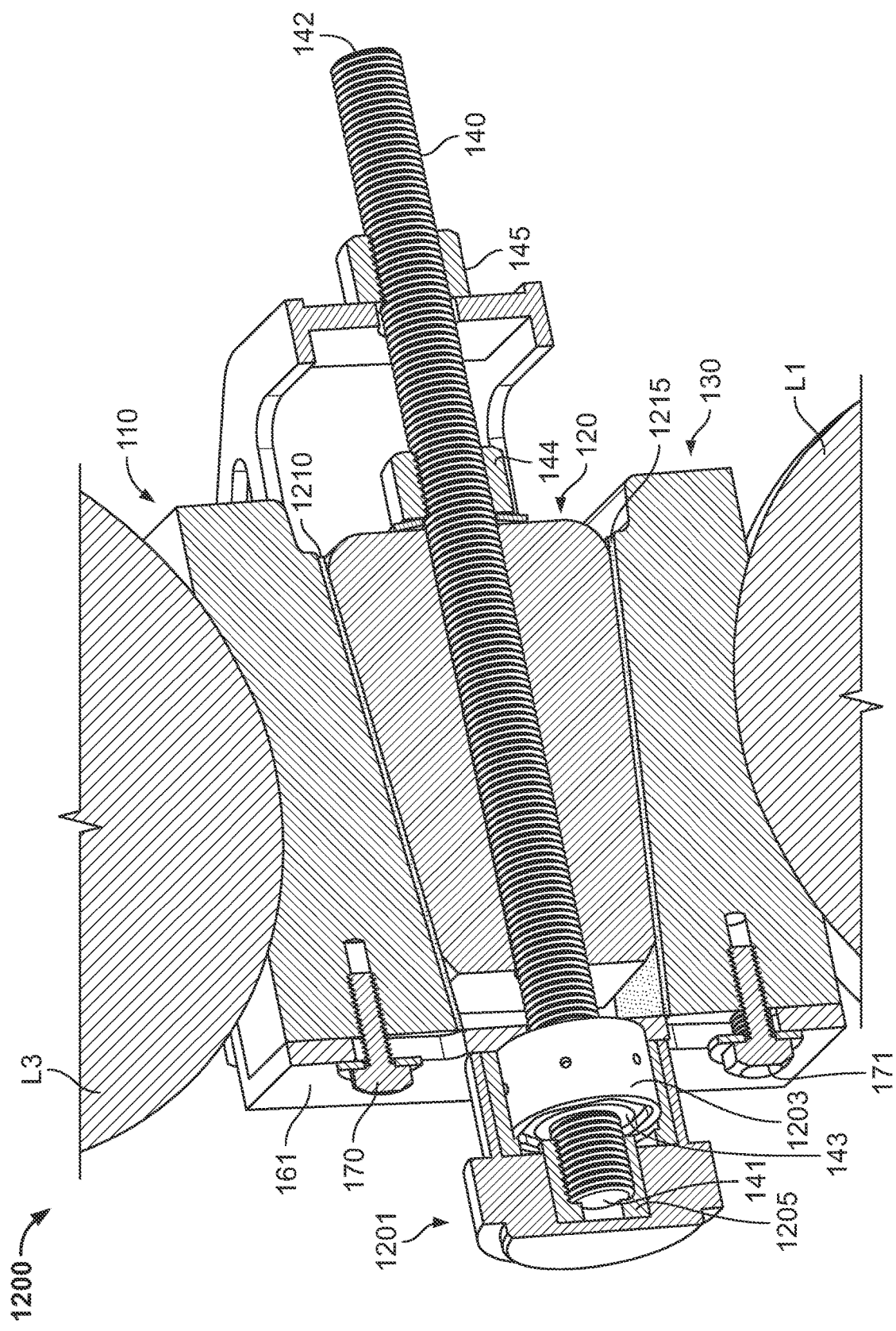
FIG. 12 depicts a close-up partial cross-sectional view of another illustrative chain brace, according to one or more embodiments described.

FIG. 12 depicts a close-up partial cross-sectional view of another illustrative chain brace 1200, according to one or more embodiments. The components of the chain brace 1200 can be similar to the components of the chain brace 100 shown in FIGS. 1 and 2-11. One main difference is that the chain brace 1200 can include, at least during installation and/or uninstallation thereof, a hydraulic actuator 1201 that can be configured to apply the force to the tension member 140 and/or remove the force from the tension member 140. In some embodiments, the hydraulic actuator 1201 can be at least partially disposed about the first nut 143. The hydraulic actuator 1201 can include a gripping sleeve 1203 that can be configured to rotate the nut 143 such that the first end 141 of the tension member 140 can be moved toward the hydraulic actuator 1201 into a receiving sleeve 1205 when the hydraulic actuator 1201 is actuated in a first direction and away from the hydraulic actuator 1201 and the receiving sleeve 1205 when the hydraulic actuator 1201 is actuated in a second direction. As such the hydraulic actuator 1201 can be used during the installation and/or uninstallation of the chain brace 1200 between the links of chain L1 and L3 (the middle chain link connecting lings L1 and L3 is not visible in FIG. 12) to apply the force and/or to remove the force on the wedge block 120 when the hydraulic actuator 1201 is actuated in the first direction or the second direction, respectively.

A second main difference between the chain brace 1200 and the chain brace 100 is that a low friction material 1210 can be disposed between the first outer block 110 and the wedge block 120 and/or a low friction material 1215 can be disposed between the second outer block 130 and the wedge block 120. In some embodiments, the low friction material 1210 and/or 1215 can be bronze, a composite, laminate material, a polytetrafluoroethylene coating, a tungsten disulfide coating, a molybdenum disulfide coating, or other low friction material having suitable properties. Suitable commercially available low friction materials can include those sold under the tradenames TEFLON® and XYLAN®.

The present disclosure further relates to any one or more of the following numbered embodiments:

1. A chain brace for restricting relative movement between first, second, and third serially connected links of a chain, comprising: a wedge block having a first end and a second end wherein the wedge block defines a bore at least partially therethrough that is oriented along an axis of the wedge block extending from the first end toward or through the second end thereof, and wherein a width of the wedge block between a set of opposing sides extending from the second end to the first end tapers toward the first end thereof; a first outer block and a second outer block, each outer block comprising a first end, a second end, and a side comprising a concave surface disposed between the first and second ends thereof; a capture frame comprising a reaction plate that defines a bore therethrough, wherein the capture frame is configured to position the first outer block, the wedge block and the second outer block within the second link of the chain, the wedge block is configured to be positioned between the first outer block and the second outer block, the first ends of the first outer block, the second outer block, and the wedge block are each configured to be orientated toward the reaction plate, the concave surface of the first outer block is configured to engage with and partially receive an outer surface of an end of the first link of chain, the concave outer surface of the second outer block is configured to engage with and partially receive an outer surface of an end of the third link of chain; and a tension member configured to be positioned through the bore defined by the reaction plate and at least partially into the bore defined by the wedge block at the first end thereof and to apply a force on the wedge block to move the wedge block in a direction toward the reaction plate such that the wedge block displaces the first and second outer block into contact with the ends of the first and third links of chain, respectively, to restrict relative movement between the first, second, and third links of the chain.

2. A process for restricting relative movement between first, second, and third serially connected links of a chain, comprising: installing a chain brace about and within the second link of chain, wherein the chain brace comprises: a wedge block having a first end and a second end, wherein the wedge block defines a bore at least partially therethrough that is oriented along an axis of the wedge block extending from the first end toward or through the second end thereof, and wherein a width of the wedge block between a set of opposing sides extending from the second end to the first end tapers toward the first end thereof; a first outer block and a second outer block, each outer block comprising a first end, a second end, and a side comprising a concave surface disposed between the first and second ends thereof; a capture frame comprising a reaction plate that defines a bore therethrough, wherein: the capture frame positions the first outer block, the wedge block, and the second outer block within the second link of the chain, the wedge block is positioned between the first outer block and the second outer block, the first ends of the first outer block, the second outer block, and the wedge block are orientated toward the reaction plate, the concave surface of the first outer block is configured to engage with and partially receive an outer surface of an end of the first link of chain, the concave outer surface of the second outer block is configured to engage with and partially receive an outer surface of an end of the third link of chain; and a tension member positioned through the bore defined by the reaction plate and at least partially into the bore defined by the wedge block at the first end thereof; and applying a force on the wedge block with the tension member to move the wedge block in a direction toward the reaction plate such that the wedge block displaces the first and second outer blocks to cause the concave surface of the first outer block and the concave surface of the second outer block to engage with and partially receive the outer surfaces of the ends of the first and third links of chain, respectively, to restrict relative movement between the first, second, and third links of the chain.

3. The chain brace or process of paragraph 1 or 2, wherein a width of the first end of the first outer block is greater than a width of the second end of the first outer block.

4. The chain brace or process of any one of paragraphs 1 to 3, wherein a width of the first end of the second outer block is greater than a width of the second end of the second outer block.

5. The chain brace or process of any one of paragraphs 1 to 4, wherein the force applied on the wedge block is sufficient to prevent movement between the first chain link and the second chain link and to prevent movement between the second chain link and the third chain link.

6. The chain brace or process of any one of paragraphs 1 to 5, wherein a side of the first outer block opposite the side comprising the concave surface is configured to interface with a first side of the wedge block, and wherein the side of the first outer block opposite the side comprising the concave surface and the first side of the wedge block are each flat.

7. The chain brace or process of any one of paragraphs 1 to 6, wherein a side of the second outer block opposite the side comprising the concave surface is configured to interface with a second side of the wedge block that is opposite the first side of the wedge block, and wherein the side of the second outer block opposite the side comprising the concave surface and the second side of the wedge block are each flat.

8. The chain brace or process of any one of paragraphs 1 to 7, further comprising a retainer frame configured to retain the first outer block, the wedge block, and the second outer block within the capture frame comprising a secondary reaction plate that defines a bore therethrough, wherein the bore defined by the wedge block extends from the first end through the second end thereof, and wherein the tension member is configured to be positioned through the bore defined by the reaction plate, the bore defined by the wedge, and the bore defined by the secondary reaction plate.

9. The chain brace or process of paragraph 8, wherein the tension member is a threaded cylindrical rod comprising a first end and a second end, and wherein the tension member is configured to be secured within the bore defined by the reaction plate, the bore defined by the wedge, and the bore defined by the secondary reaction plate via a nut disposed on each end of the threaded cylindrical rod.

10. The chain brace or process of paragraphs 8 or paragraph 9, wherein the retainer frame comprises a first bracket and a second bracket, wherein the first and second brackets of the retainer frame are configured to engage with the second link of the chain, and wherein the retainer frame is configured to matingly engage with the capture frame.

11. The chain brace or process of any one of paragraphs 1 to 10, wherein an inner surface of the bore defined by the wedge block comprises a threaded inner surface, and wherein the tension member is a threaded bolt configured to be threadingly engageable with the inner surface of the bore defined by the wedge block.

12. The chain brace or process of any one of paragraphs 1 to 11, wherein the tension member comprises a hydraulic actuator configured to apply the force to the tension member.

13. The chain brace or process of any one of paragraphs 1 to 12, wherein at least one of an interface between the first outer block and the wedge block and an interface between the second outer block and the wedge block comprises a low friction material disposed therebetween.

14. The chain brace or process of any one of paragraphs 1 to 13, wherein the capture frame comprises a first bracket and a second bracket, wherein the first and second brackets of the capture frame are configured to engage with the second link of the chain.

15. The chain brace or process of any one of paragraphs 1 to 14, wherein the reaction plate further defines a first slot, and wherein the first end of the first outer block defines a threaded cylindrical bore that is configured to align with the first slot, the chain brace further comprising a first threaded fastener configured to be disposed though the first slot and threadingly engageable with the threaded bore of the first outer block.

16. The chain brace or process of paragraph 15, wherein the reaction plate further defines a second slot, and wherein the first end of the second outer block defines a threaded cylindrical bore that is configured to align with the second slot, the chain brace further comprising a second threaded fastener configured to be disposed though the second slot and threadingly engageable with the threaded bore of the second outer block.

17. The chain brace or process of any one of paragraphs 1 to 16, wherein the reaction plate further defines a first slot therethrough, and wherein the first end of the first outer block further comprises a first protrusion that is configured to be positioned within the first slot.

18. The chain brace or process of any one of paragraphs 17, wherein the reaction plate further defines a second slot therethrough, and wherein the first end of the second outer block further comprises a second protrusion that is configured to be positioned within the first slot.

19. The chain brace or process of any one of paragraphs 1 to 18, wherein the bore defined by the wedge block is substantially normal to the first end and the second end of the wedge block.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While certain preferred embodiments of the present invention have been illustrated and described in detail above, it is apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A chain brace for restricting relative movement between a first link of a chain, a second link of the chain, and a third link of the chain that are serially connected to one another, comprising:
   a wedge block having a first end and a second end, wherein the wedge block defines a bore at least partially therethrough that is oriented along an axis of the wedge block extending from the first end toward or through the second end thereof, and wherein a width of the wedge block between a set of opposing sides extending from the second end to the first end tapers toward the first end thereof;
   a first outer block and a second outer block, each of the first outer block and the second outer block comprising a first end, a second end, and a side comprising a concave surface disposed between the first and second ends thereof,
   a capture frame comprising a reaction plate that defines a bore therethrough, wherein:

the capture frame is configured to position the first outer block, the wedge block, and the second outer block within the second link of the chain, the wedge block is configured to be positioned between the first outer block and the second outer block, each of the first end of the first outer block, the first end of the second outer block, and the first end of the wedge block is configured to be orientated toward the reaction plate, the concave surface of the first outer block is configured to engage with and partially receive an outer surface of an end of the first link of the chain, the concave surface of the second outer block is configured to engage with and partially receive an outer surface of an end of the third link of the chain; and a tension member configured to be positioned through the bore defined by the reaction plate and at least partially into the bore defined by the wedge block at the first end thereof and to apply a force on the wedge block to move the wedge block in a direction toward the reaction plate such that the wedge block displaces the first outer block and the second outer block into contact with the ends of the first link of the chain and the third link of the chain, respectively, to restrict the relative movement between the first link of the chain, the second link of the chain, and the third link of the chain.

2. The chain brace of claim 1, wherein a width of the first end of the first outer block is greater than a width of the second end of the first outer block.

3. The chain brace of claim 2, wherein a width of the first end of the second outer block is greater than a width of the second end of the second outer block.

4. The chain brace of claim 1, wherein the force on the wedge block prevents movement between the first link of the chain and the second link of the chain and prevents movement between the second link of the chain and the third link of the chain.

5. The chain brace of claim 1, wherein a side of the first outer block opposite the side comprising the concave surface is configured to interface with a first side of the wedge block, and wherein each of the side of the first outer block opposite the side comprising the concave surface and the first side of the wedge block is flat.

6. The chain brace of claim 5, wherein a side of the second outer block opposite the side comprising the concave surface is configured to interface with a second side of the wedge block that is opposite the first side of the wedge block, and wherein each of the side of the second outer block opposite the side comprising the concave surface and the second side of the wedge block is flat.

7. The chain brace of claim 1, further comprising a retainer frame configured to retain the first outer block, the wedge block, and the second outer block within the capture frame comprising a secondary reaction plate that defines a bore therethrough, wherein the bore defined by the wedge block extends from the first end through the second end thereof, and wherein the tension member is configured to be positioned through the bore defined by the reaction plate, the bore defined by the wedge, and the bore defined by the secondary reaction plate.

8. The chain brace of claim 7, wherein the tension member is a threaded cylindrical rod comprising a first end and a second end, and wherein the tension member is configured to be secured within the bore defined by the reaction plate, the bore defined by the wedge, and the bore defined by the secondary reaction plate via a nut disposed on each end of the threaded cylindrical rod.

9. The chain brace of claim 7, wherein the retainer frame comprises a first bracket and a second bracket, wherein the first and second brackets of the retainer frame are configured to engage with the second link of the chain, and wherein the retainer frame is configured to matingly engage with the capture frame.

10. The chain brace of claim 1, wherein an inner surface of the bore defined by the wedge block comprises a threaded inner surface, and wherein the tension member is a threaded bolt configured to be threadingly engageable with the inner surface of the bore defined by the wedge block.

11. The chain brace of claim 1, wherein the tension member comprises a hydraulic actuator configured to apply the force to the tension member.

12. The chain brace of claim 1, wherein at least one of an interface between the first outer block and the wedge block and an interface between the second outer block and the wedge block comprises a low friction material disposed therebetween.

13. The chain brace of claim 1, wherein the capture frame comprises a first bracket and a second bracket, wherein the first and second brackets of the capture frame are configured to engage with the second link of the chain.

14. The chain brace of claim 1, wherein the reaction plate further defines a first slot, and wherein the first end of the first outer block defines a threaded cylindrical bore that is configured to align with the first slot, the chain brace further comprising a first threaded fastener configured to be disposed though the first slot and threadingly engageable with the threaded bore of the first outer block.

15. The chain brace of claim 14, wherein the reaction plate further defines a second slot, and wherein the first end of the second outer block defines a threaded cylindrical bore that is configured to align with the second slot, the chain brace further comprising a second threaded fastener configured to be disposed though the second slot and threadingly engageable with the threaded bore of the second outer block.

16. The chain brace of claim 1, wherein the reaction plate further defines a first slot therethrough, and wherein the first end of the first outer block further comprises a protrusion that is configured to be positioned within the first slot.

17. The chain brace of claim 16, wherein the reaction plate further defines a second slot therethrough, and wherein the first end of the second outer block further comprises a protrusion that is configured to be positioned within the second slot.

18. The chain brace of claim 1, wherein the bore defined by the wedge block is normal to the first end and the second end of the wedge block.

19. A process for restricting relative movement between a first link of a chain, a second link of the chain, and a third link of the chain that are serially connected to one another, comprising:

installing a chain brace about and within the second link of chain, wherein the chain brace comprises:

a wedge block having a first end and a second end, wherein the wedge block defines a bore at least partially therethrough that is oriented along an axis of the wedge block extending from the first end toward or through the second end thereof, and wherein a width of the wedge block between a set of opposing sides extending from the second end to the first end tapers toward the first end thereof;

a first outer block and a second outer block, each of the first outer block and the second outer block comprising a first end, a second end, and a side comprising a concave surface disposed between the first and second ends thereof, a capture frame comprising a reaction plate that defines a bore therethrough, wherein:
- the capture frame positions the first outer block, the wedge block, and the second outer block within the second link of the chain,
- the wedge block is positioned between the first outer block and the second outer block,
- each of the first end of the first outer block, the first end of the second outer block, and the first end of the wedge block is orientated toward the reaction plate,
- the concave surface of the first outer block is configured to engage with and partially receive an outer surface of an end of the first link of the chain,
- the concave surface of the second outer block is configured to engage with and partially receive an outer surface of an end of the third link of the chain; and a tension member positioned through the bore defined by the reaction plate and at least partially into the bore defined by the wedge block at the first end thereof; and applying a force on the wedge block with the tension member to move the wedge block in a direction toward the reaction plate such that the wedge block displaces the first outer block and the second outer block to cause the concave surface of the first outer block and the concave surface of the second outer block to engage with and partially receive the outer surfaces of the ends of the first link of the chain and the third link of the chain, respectively, to restrict the relative movement between the first link of the chain, the second link of the chain, and the third link of the chain.

20. The process of claim 19, wherein the chain brace further comprises a retainer frame configured to retain the first outer block, the wedge block, and the second outer block within the capture frame comprising a secondary reaction plate that defines a bore therethrough, wherein the bore defined by the wedge block extends from the first end through the second end thereof, and wherein the tension member is configured to be positioned through the bore defined by the reaction plate, the bore defined by the wedge, and the bore defined by the secondary reaction plate.

* * * * *